Sept. 26, 1939.  C. S. KELLEY  2,173,943
BRAKE VALVE HANDLE
Filed Aug. 12, 1938  3 Sheets-Sheet 1

INVENTOR
CECIL S. KELLEY
BY
ATTORNEY

Sept. 26, 1939.　　　C. S. KELLEY　　　2,173,943
BRAKE VALVE HANDLE
Filed Aug. 12, 1938　　　3 Sheets-Sheet 2
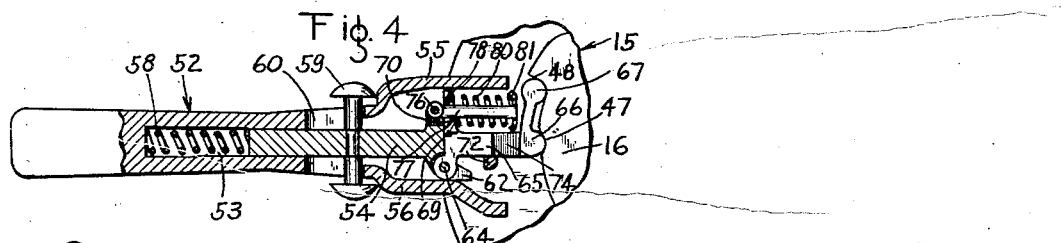
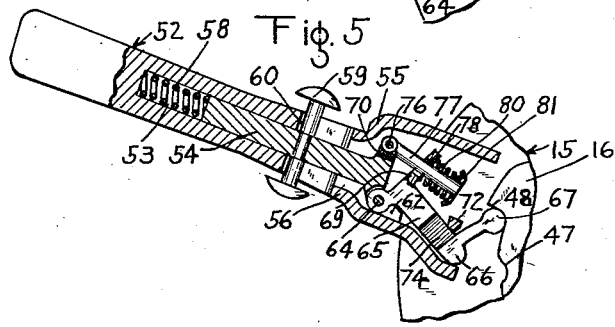
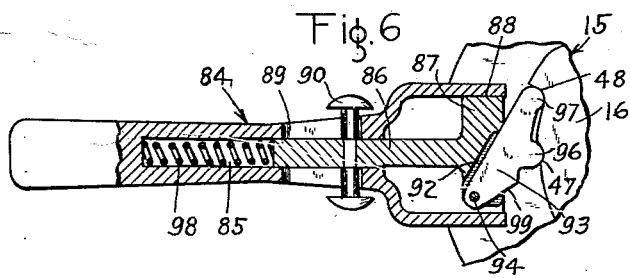
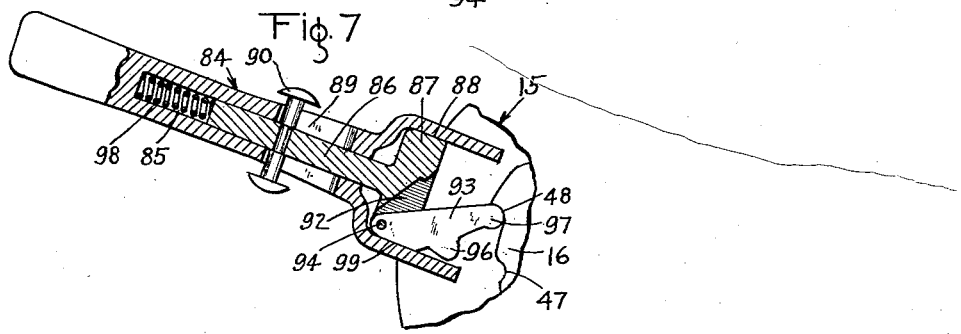
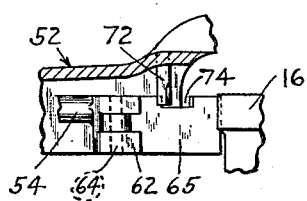
INVENTOR
CECIL S. KELLEY
BY
ATTORNEY Sept. 26, 1939.  C. S. KELLEY  2,173,943
BRAKE VALVE HANDLE
Filed Aug. 12, 1938  3 Sheets-Sheet 3
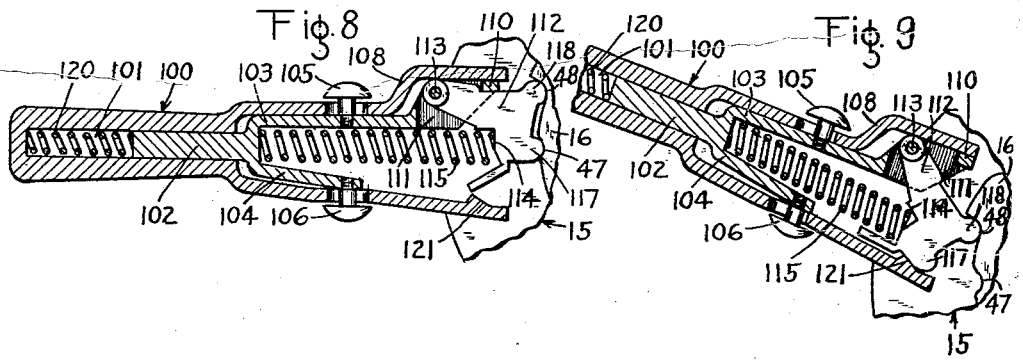
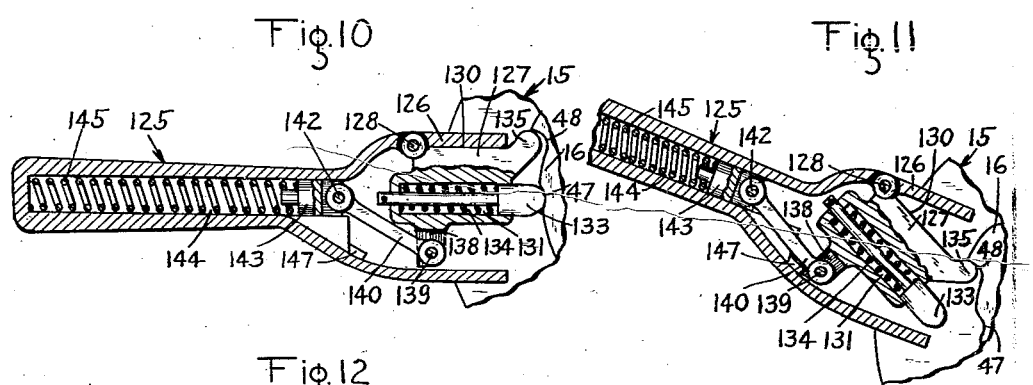
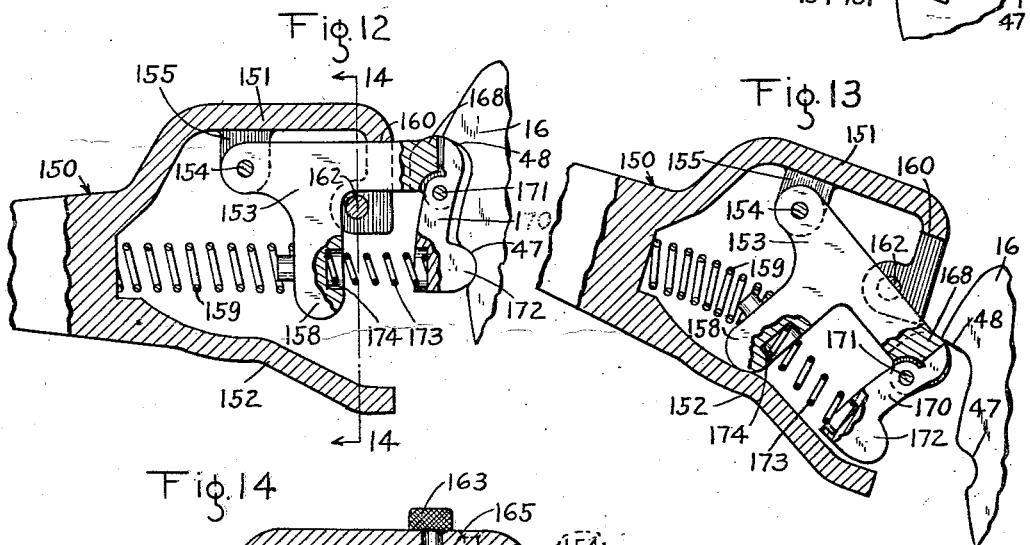
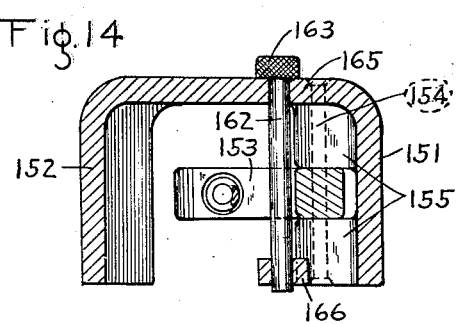
INVENTOR
CECIL S. KELLEY
BY
A. M. Wiggins
ATTORNEY Patented Sept. 26, 1939

2,173,943

UNITED STATES PATENT OFFICE 2,173,943

BRAKE VALVE HANDLE

Cecil S. Kelley, Forest Hills, Pa., assignor to The Westinghouse Air Brake Company, Wilmerding, Pa., a corporation of Pennsylvania Application August 12, 1938, Serial No. 224,465

8 Claims. (Cl. 251—153)

This invention relates to fluid pressure brakes, and more particularly to an improved handle device for a brake valve device employed in a fluid pressure brake system.

It has been found that, in the operation of trains equipped with air brakes of advanced design, such as the well known Westinghouse E T locomotive brake apparatus, the most satisfactory results are obtained in effecting release of the brakes by operation of the brake valve device to running position only, without operation thereof to the formerly useful release position. While it would be entirely practicable to prevent an engineer of a train from using the release position commonly provided on the locomotive brake valve device, it has been considered preferable to provide means to discourage movement of the brake valve device beyond running position to release position, which means may be forced to yield to permit such movement to release position in the event that circumstances require such operation.

The principal object of my invention is to provide an improved handle for a locomotive brake valve device of the above type, which handle may be substituted for the existing handle employed with standard E T locomotive brake equipments, and which incorporates yielding means adapted to resist movement of the handle beyond running position to release position and effective to return said handle from release position to running position unless the handle is held against the force of the yielding means.

Other objects and advantages of the invention will appear in the following detailed description of several preferred embodiments thereof, taken in connection with the accompanying drawings, wherein Fig. 1 is an elevational view, partly in section, showing a brake valve handle applied to the quadrant and associated portions of a brake valve device of the class to which my invention relates;

Figs. 4 and 5 are similar views of another form of handle embodying the invention;

Fig. 4a is an enlarged detail vertical sectional view of a portion of the handle shown in Fig. 4;

Figs. 6 and 7 are plan views, partly in section, showing still another form of handle embodying the invention;

Figs. 8 and 9, 10 and 11, and 12 and 13 are paired sectional plan views of still other and different forms of brake valve handles constructed according to the invention, each form of handle being shown in both running and release positions; and Fig. 14 is a sectional view taken on the line 14—14 of Fig. 12.

Figure 1:
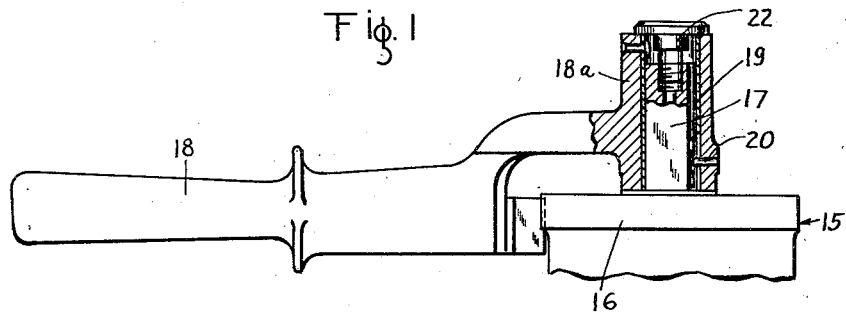

Referring to Fig. 1 of the drawings, there is shown a portion of a brake valve device 15 provided with the usual quadrant 16 and having associated therewith an operating shaft 17, which is operatively connected to a rotary valve, not shown. Mounted on the brake valve device 15 is a handle 18 having a vertically disposed socket portion 18a sleeved on the shaft 17. The shaft 17 is provided with a longitudinal groove 19 into which is fitted a pin 20 secured to the socket portion 18 for preventing relative movement between the handle 18 and the shaft 17. A cap screw 22 may be inserted through the open end of the socket portion 18a and into screw-threaded engagement with the shaft 17. It will be understood that each of the forms of the improved brake valve handle embodying my invention and hereinafter described may be mounted on the brake valve device in the manner shown in Fig. 1.

Figure 2:
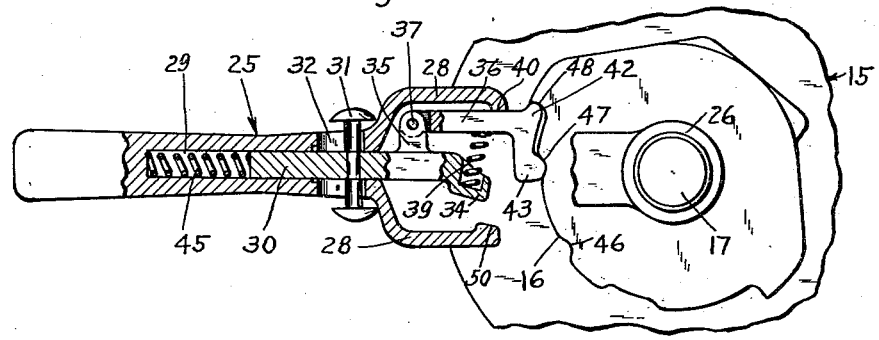
Figs. 2 and 3 are plan views, partly in section, of one form of brake valve handle embodying the invention and disposed in running and release positions, respectively.
Figure 3:
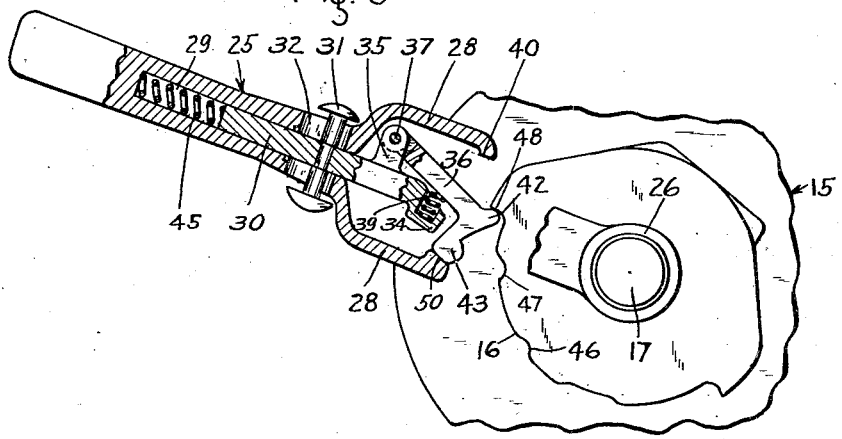

As shown in Figs. 2 and 3 of the drawings, one form of brake valve handle constructed according to the invention comprises a handle 25 having a socket portion 26 fitted on the shaft 17 of the brake valve device 15, and provided with off-set guard portions 28 disposed adjacent but spaced from the usual quadrant 16 of the brake valve device 15. The handle 25 has formed therein a longitudinal bore 29 in which is slidably mounted a plunger 30 having secured thereto the usual feeler button 31, which projects laterally through an aperture 32 formed in the handle. The end of the plunger 30 adjacent the brake valve device has formed thereon a spring seat portion 34 and a lug 35, to which lug a latch member 36 is pivotally connected by means of a pin 37.

The latch member 36 is adapted normally to extend in parallel alignment with the axis of the handle 25 and of the plunger 30 under the pressure of a coil spring 39, which is interposed between the latch 36 and the spring seat portion 34 of the plunger for urging the latch member into engagement with a stop portion 40 of the adjacent guard 38, as shown in Fig. 2 of the drawings. The outer end of the latch member 36 has formed thereon a butt portion 42 and a head portion 43 laterally spaced from the butt portion. With the handle positioned as shown in Fig. 2, the head portion 43 is normally held in coaxial alignment with the plunger 30. The head 43 is adapted to ride in sliding engagement with the notched surface of the brake valve quadrant 16 under the force of a coil spring 45, which is interposed between the inner end of the plunger 30 and the end wall of the bore 29 of the handle 25.

The quadrant 16 of the brake valve device 15 is of the usual type having suitable notches for indicating the several positions of the brake valve device, such as a service position notch 46, a running position notch 47, and a release position notch or stop 48. It will be understood that, with the brake valve device provided with an ordinary handle having a simple spring-pressed pawl or latch engageable in the quadrant notches, all of said notches including the release position notch 48 would be engageable by the spring-pressed pawl in accordance with movement of the handle into the respective positions of the brake valve device. According to the invention, however, the head 43 of the latch member 36 is adapted for engagement in any of the position notches except the release position notch 48, the butt portion 42 of the latch member being adapted to engage the release notch for resisting movement of the brake valve handle into release position.

It will thus be apparent that as the brake valve handle shown in Fig. 2 is operated to the various positions indicated by the notches, with the exception of the release position notch 48, the latch member 36 and associated plunger 30 will be displaced against the force of the spring 45 as the head portion 43 overrides the portions of the quadrant 16 between the several notches, this action of the plunger 30 being communicated to the feeler button 31 for enabling the operator to position the handle accurately. During such normal operation of the handle, the spring 39 remains effective to maintain the latch member 36 in engagement with the stop portion 40 as already explained.

If it is desired to move the brake valve handle beyond running position to release position, as shown in Fig. 3 of the drawings, the operator in so moving the brake valve handle must exert sufficient force on the handle portion 25 to overcome the pressure of the coil spring 39 acting on the latch member 36, which latch member is at the same time canted in a clockwise direction about the pivot pin 37 due to engagement of the butt portion 42 with the release position notch 48. Upon movement of the brake valve handle to the release position, further movement beyond that position is prevented by engagement of the head portion 43 of the latch member 36 with a stop lug 50 formed on the guard portion 28 of the brake valve handle. It will be noted in Fig. 3 of the drawings, that with the brake valve handle in release position, with the head portion 43 of the latch member in engagement with the stop lug 50, the butt portion 42 of the latch member engaging the release position notch 48 is disposed substantially along the axis of the handle 25, so that the improved brake valve handle embodying my invention occupies exactly the same release position relative to the brake valve device 15 as would an ordinary formerly standard brake valve handle not having the improved construction.

Unless the operator continues to hold the handle 25 in the release position as shown in Fig. 3, the handle will be automatically returned to running position. Thus if the operator withdraws his hand from the handle 25, the spring 39 is rendered effective to act through the medium of the spring seat portion 34 and the plunger 30 to shift the handle 25 to the running position as shown in Fig. 2, where the handle will remain until again manually operated.

Referring to Figs. 4 and 5 of the drawings, there is shown a brake valve handle 52 associated with the brake valve device 15, which handle embodies features of the invention already described with certain details of construction somewhat different from those of the handle 25 shown in Fig. 2. The handle 52 has formed therein a longitudinal bore 53 in which is slidably mounted a plunger member 54, the free end of which extends into the space between spaced guard portions 55 and 56 formed on the handle. The plunger 54 is subject to the force of a spring 58 interposed between the inner end of the plunger and the end wall of the bore 53, and is provided with the usual feeler button 59 extending outwardly of the handle 52 through a suitable aperture 60. The free end of the plunger 54 has formed thereon a lug 62 which is adapted for sliding engagement with the inner surface of the guard portion 56 of the handle.

Pivotally mounted on a pin 64 carried by the lug 62 of the plunger is a latch member 65 having a head portion 66 which is adapted for engagement in the various notches of the brake valve quadrant 16, such as the running position notch 47, and a butt portion 67 which is formed on the latch member 65 laterally of the head portion 66. A flange portion 69 formed on the latch member 65 adjacent the pivotal connection thereof with the pin 64 is adapted to engage a flat surface 70 formed on the plunger 54 for preventing misalignment of the latch member in a counter-clockwise direction about the pivot pin, while the lateral surface of the latch member is adapted to engage a lug 72 formed on the handle 52 for normally preventing clockwise movement of the latch member about the pin 64.

As shown in Fig. 4a, the latch member 65 has formed in the upper surface thereof a groove 74 adjacent the surface of the latch member normally engaging the lug 72, which groove is adapted to clear the lug upon withdrawal of the plunger 54 through the medium of the feeler button 59 as hereinafter explained, when the handle is to be operated to release position.

A pin 76 is carried on the free end of the plunger 54 adjacent the surface 70 thereof, to which pin is pivotally connected a rod 77 which extends through a suitable aperture 78 formed in the flange portion 69 of the latch member 65. A coil spring 80 is supported by the rod 77 between the flange portion 69 of the latch member and a spring seat 81 secured to the end of the rod, which spring is adapted to urge the flange portion 69 into normal engagement with the flat surface 70 of the plunger member 54 and to resist movement of the latch member 65 in a clockwise direction about the pivot pin 64.

With the associated elements of the handle 52 disposed as shown in Fig. 4 of the drawings, movement of the handle from running position as shown toward the release position is prevented because of the engagement of the butt portion 67 of the latch member 65 with the release position notch 48 of the brake valve quadrant, the latch member 65 being at the same time locked against movement by engagement with the lug 72 of the handle. In order to move the brake valve handle 52 to the release position, the operator may move the feeler button 59 to retract the plunger 54 and the latch member 65 until the groove 74 of the latch member registers with the lug 72 of the handle, whereupon the handle 52 may be moved beyond running position into release position, as shown in Fig. 5. During such movement the latch member 65 is of course canted in a clockwise direction about the pivot pin 64 against the force of the spring 80.

If the operator releases his grip on the handle 52 while it is disposed in release position as shown in Fig. 5, the coil spring 80 is rendered effective through the leverage afforded by the flange portion 69 of the latch member 65 to force the handle 52 out of the release position toward running position, the inertia of the handle 52 being sufficient to cause the lug 72 thereon to override the wall of the groove 74 of the latch member while the spring 58 is still partially suppressed, so that full movement of the handle to running position is normally effected.

In Figs. 6 and 7 of the drawings, my invention is shown embodied in a brake valve handle 84 having a bore 85 within which is slidably mounted a plunger 86 having an enlarged end 87, which is guided within a guard portion 88 formed on the handle. The handle 84 is provided with a lateral opening 89 through which extends the feeler button 90 carried by the plunger 86.

The enlarged end 87 of the plunger 86 has formed therein an inclined groove 92 within which is fitted a toggle latch member 93, one end of which is pivotally connected by means of a pin 94 to the end 87 within the groove 92. The toggle latch member 93 is normally disposed in a canted position relative to the handle 84, as shown in Fig. 6, and has formed thereon a head portion 96 which is normally positioned along the axis of the plunger 86 and is adapted to engage the running position notch 47 and other notches of the brake valve quadrant 16. On the outer end of the toggle latch member 93 is formed a butt portion 97, which is adapted to engage in the release position notch 48 of the brake valve quadrant while the head portion 96 engages in the running position notch 47. The usual coil spring 98 is provided for urging the plunger 86 and latch member 93 toward the brake valve quadrant.

It will be understood that with the toggle latch member 93 positioned as shown in Fig. 6, movement of the brake valve handle 84 out of running position toward release position is resisted by the spring 98 acting through the medium of the plunger 86 and the latch member 93. If the operator exerts sufficient force on the handle 84, however, the brake valve handle may be shifted to the release position, as shown in Fig. 7. As the handle 84 is thus moved to release position the butt portion 97 of the toggle latch member 93 remains in engagement with the release position stop 48, so that the latch member is caused to turn about the pivot pin 94 in a clockwise direction and at the same time to force the plunger 86 outwardly against the pressure of the spring 98, until a face 99 of the toggle latch member engages the adjacent wall of the guard portion 88, at which time said member is still inclined with respect to the axis of the handle 84.

It will be apparent that so long as the brake valve handle 84 is held in release position as shown in Fig. 7, the spring 98 continues to exert a force through the medium of a plunger 86 and toggle latch member 93 tending to move the handle back to running position, and that the handle 84 will thus not remain in the release position unless the operator continues to apply positive force thereto for maintaining the spring 98 compressed.

As shown in Figs. 8 and 9 of the drawings, my invention may be embodied in a somewhat modified brake valve handle 100, comprising a handle portion having a bore 101 within which is slidably mounted a plunger 102 having arm portions 103 and 104, which carry feeler buttons 105 and 106, respectively. The arm portion 103 is adapted for sliding engagement with the adjacent wall of a guard portion 108 of the handle 100, and is provided with an enlarged end portion or lug 110 having formed therein a laterally disposed recess 111. A latch member 112 is pivotally connected to the enlarged portion 110 by means of a pin 113, and has formed thereon a spring seat portion 114 for receiving the end of a coil spring 115 carried by the plunger 102.

The latch member 112 has formed thereon a head portion 117 adapted for engagement in the various notches of the brake valve quadrant 16, including the running position notch 47, as shown in Fig. 8 of the drawings. A butt portion 118 formed on the latch member 112 is adapted to engage in the usual release position stop 48 of the brake valve quadrant while the head portion 117 engages in the notch 47. The plunger 102 and latch member 112 are subject to the force of a spring 120 acting on the plunger member within the bore 101.

If the brake valve handle 100 is moved from the running position as shown in Fig. 8 toward the release position as shown in Fig. 9, the latch member 112, due to engagement of the butt portion 118 in the release position notch 48, is rotated in a clockwise direction about the pivot pin 113, thereby compressing the coil spring 115, which resists such movement beyond the running position. Upon engagement of the head portion 117 with a lug 121 formed on the handle 100, further movement of the brake valve handle as just explained is stopped. As in the cases of the other embodiments of the invention heretofore described, it will be apparent that the spring 115 is adapted to exert a constant force through the medium of the latch member 112 for urging return of the handle 100 to running position.

Referring to Figs. 10 and 11, the invention is further illustrated in the form of a brake valve handle 125 having a hollow guard portion 126, within which is disposed a latch member 127 having pivotal connection with the guard portion by means of a pin 128. The latch member 127 is provided with a flat lateral surface 130 adapted for engagement with the inner wall of the guard portion 126, and has formed therein a longitudinal bore 131, which is disposed in parallel alignment with the surface 130 and is adapted to be positioned in coaxial alignment with the handle 125 as shown in Fig. 10. A plunger 133 is slidably fitted within the bore 131 of the latch member 127 and is adapted to engage in the running position notch 47 and other notches of the brake valve quadrant 16 under the force of a coil spring 134 that is disposed within the bore 131. A butt portion 135 is provided on the latch member 127 for engaging the release position stop or notch 48 when the head of the plunger 133 engages in the running position notch 47, as shown in Fig. 10.

A laterally projecting lug 138 is formed on the latch member 127 and carries a pin 139 to which is pivotally connected a link 140, which is disposed on an angle with respect to the axis of the handle 125. The end of the link 140 opposite the pin 139 is pivotally connected to a pin 142 carried on a plunger 143 that is slidably mounted in a bore 144 formed longitudinally in the handle 125. A coil spring 145 is disposed in the bore 144 and acts through the medium of the plunger 143 and link 140 to maintain the latch member 127 in the normal position shown in Fig. 10.

With the elements of the brake valve handle 125 disposed in their normal positions as shown in Fig. 10, as the brake valve handle is operated, in controlling the air brakes, through the usual range of positions, with the exception of release position, the plunger 133 is pressed under the force of the spring 134 into engagement in corresponding position indicating notches of the brake valve quadrant 16, thus permitting operation of the brake valve device in the usual manner.

In order to move the brake valve handle 125 beyond the running position as shown in Fig. 10 and into release position, as indicated in Fig. 11, the operator must apply such additional force to the handle as is required to overcome the force exerted by the coil spring 145 through the medium of the plunger 143, link 140 and latch member 127, the butt portion 135 of which is at this time fulcrumed at the release position notch 48. As the handle 125 is thus moved beyond running position into release position, the butt portion 135 of the latch member 137 is held against movement due to its engagement with the release position notch 48, while the portion pivotally connected to the pin 128 is carried toward the position shown in Fig. 11, the latch member 127 being consequently tilted about the pin 128 in a clockwise direction so as to move the link 140 and plunger 143 outwardly against the force of the spring 145. The plunger 143 is at the same time shifted out of engagement with the running position notch 47. Movement of the brake valve handle 125 beyond the release position is prevented by engagement of the lug 138 with a stop portion 147 formed on the handle, at which time the butt portion 135 of the latch member 127 is disposed substantially along the axis of the handle 125.

According to the invention as embodied in the structure shown in Figs. 12 and 13 of the drawings, a brake valve handle 150 is provided in association with the brake valve device including the usual quadrant 16, these parts being shown in fragmentary form in order to permit their illustration in enlarged detail views.

The brake valve handle 150 has formed thereon, adjacent the brake valve quadrant 16, a guard portion including flanges 151 and 152, between which is disposed a carrier member 153 having one end pivotally connected by means of a pin 154 to lugs 155 carried by the flange 151. The pin 154 is vertically disposed, so that the carrier member 153 is movable in the same plane of movement of that of the brake valve handle 150. Interposed between the handle 150 and an arm portion 158 projecting laterally from the carrier member 153 is a coil spring 159, which is adapted to urge the carrier member into a normal position in engagement with a stop shoulder 160 formed on the flange 151, as shown in Fig. 12. For preventing movement of the carrier member 153 out of the normal position there is provided a vertically disposed pin 162 having a head 163, which pin is adapted to be removably inserted in suitable bores formed in a web portion 165 and a lug 166 carried by the handle 150, as shown in Fig. 14 of the drawings. With the pin 162 in place, movement of the carrier member 153 out of the position shown in Fig. 12 is blocked.

A butt portion 168 of the carrier member 153 projects beyond the stop shoulder 160 of the brake valve handle and is adapted to engage the usual release position notch 48 formed in the brake valve quadrant 16 upon movement of the brake valve to running position as shown in Fig. 12 of the drawings. A latch member 170 is pivotally connected by means of a pin 171 to the butt portion 168 of the carrier member and has formed on the free end thereof a head portion 172, which is adapted to be urged inwardly toward the brake valve quadrant under the force of a coil spring 173 interposed between the head portion and a suitable cavity 174 formed in the arm 158 of the carrier member 153. With the carrier member 153 held in the normal position as shown in Fig. 12, the head portion 172 of the latch member 170 is disposed along the longitudinal axis of the brake valve handle 150, and is adapted for engagement in the various position notches of the brake valve quadrant 16, such as the running position notch 47.

It will thus be understood that, with the elements of the brake valve handle 150 disposed as shown in Fig. 12 and with the pin 162 in place as shown in Fig. 14, operation of the brake valve handle may be effected in the usual manner for controlling the brakes, movement of the brake valve handle to release position, however, being prevented by reason of blocking engagement of the carrier member 153 with the pin 162 as already explained.

If it is deemed necessary to move the brake valve handle 150 beyond running position into release position, the pin 162 may be withdrawn from its normal position in the handle and out of the path of movement of the carrier member 153, after which the brake valve handle 150 may be turned into the release position, as shown in Fig. 13. At the same time, the coil spring 159 becomes effective to resist such movement of the handle to release position, as the carrier member 153 is caused to turn in a clockwise direction with relation to the pin 154, due to the engagement of the butt portion 168 with the release position notch 48 of the brake valve quadrant 16. As hereinbefore explained in connection with the other embodiment of the invention, the operator must continue to hold the brake valve handle 150 in release position for the desired interval, since the spring 159 exerts a constant pressure against the carrier member 153 tending to actuate the carrier member to return the handle to running position.

From the foregoing description of various alternative designs of brake valve handle embodying my invention, it will be observed that such a handle may be substituted for the existing or formerly standard type of brake valve handle associated with the usual brake valve device, and that my improved handle may then be operated in the usual manner to control application and release of the brakes, but subject to the condition that movement of the handle to the now disfavored release position is automatically opposed by a yielding means, which is adapted to effect return movement of the handle to running position when the handle is released.

While I have described several embodiments of the invention in detail, it will be understood that I do not wish to limit its scope to those embodiments or otherwise than by the terms of the appended claims.

Having now described my invention, what I claim as new and desire to secure by Letters Patent, is:

1. An operating handle for a brake valve device of the class including a quadrant having notches indicating various brake valve positions such as adjacent running and release positions, said handle comprising a yieldingly mounted member, a latch member pivotally connected to said member and adapted to engage said quadrant notches under a normal pressure in all positions of the handle other than release position, and spring means cooperative with said latch member for resisting movement of the handle beyond running position into release position with greater than normal pressure.

2. An operating handle for a brake valve device of the class including a quadrant having notches indicating various brake valve positions such as adjacent running and release positions, said handle comprising a spring-pressed member, a latch element pivotally connected to said member and having a head engageable with said running position notch and a butt portion adjacent said head, and spring means yieldingly positioning said latch element to effect engagement of said butt portion with said release position notch upon movement of said handle beyond running position toward release position, said latch element being displaced, during such movement to release position, against the opposing force of said spring means.

3. An operating handle for a brake valve device of the class including a quadrant having notches indicating various brake valve positions such as adjacent running and release positions, said handle comprising a grip portion having a longitudinal bore, a plunger slidably mounted in said bore, spring means, a latch member associated with said plunger and having a portion adapted for rocking engagement with said release position notch upon movement of said handle beyond running position toward release position, and a hinge pin pivotally connecting said latch member to the free end of said plunger, through the medium of which pin the latch member is canted against the opposing force of said spring means upon movement of said handle to release position.

4. In an operating handle for a brake valve device having a notched quadrant including a stop shoulder indicating a terminal position, in combination, a hollow guard portion carried by the handle and having a stop lug, a member operatively mounted within said guard portion and movable toward and away from said quadrant, a latch element pivotally connected to said movable member for normally yieldingly engaging said quadrant and having an offset butt portion movable with the handle in a direction toward said terminal position into rocking engagement with said stop shoulder on the quadrant, said latch element being thereby conditioned for rotation about the pivotal connection with the movable member into locking engagement with said stop lug on the guard portion to prevent movement of the handle beyond said terminal position, and spring means carried by said handle for resisting rotation of said latch element during movement of said handle to said terminal position.

5. An operating handle adapted to be mounted on a brake valve device provided with a notched quadrant having a stop portion indicating a terminal position, said handle including a guard portion having an interior lug, a plunger slidably mounted in said handle, a spring urging said plunger toward said quadrant, a latch element pivotally connected to said plunger and adapted to engage said quadrant stop on movement of the handle in one direction, said latch element being normally locked against said interior lug to block movement of the handle to said terminal position, and means for manually actuating said plunger against the force of said spring to cause the latch element to clear said interior lug for permitting movement of the handle to said terminal position.

6. An operating handle adapted to be mounted on a brake valve device provided with a notched quadrant having a stop portion indicating a terminal position, said handle including a guard portion having an interior lug, a plunger slidably mounted in said handle, a spring urging said plunger toward said quadrant, a latch element pivotally connected to said plunger and adapted to engage said quadrant stop portion on movement of the handle in one direction, said latch element being normally locked against said interior lug to block movement of the handle to said terminal position, means for manually actuating said plunger against the force of said spring to cause the latch element to clear said interior lug, and a spring opposing pivotal movement of said latch element relative to said plunger as the handle is moved to said terminal position.

7. An operating handle for a brake valve device provided with a notched quadrant having a stop portion indicating a terminal position, said handle including a guard portion, a plunger slidably mounted therein, a spring urging said plunger inwardly toward said quadrant, and a toggle latch element having one end pivotally connected to said plunger and the other or free end adapted to engage said stop portion of the quadrant when the handle is moved toward said terminal position, said toggle latch element being normally disposed on said plunger at an angle with said free end thereof inclined toward said stop portion of the quadrant so that, upon engagement of said end portion and stop portion, continued movement of the handle into the terminal position effects turning of said toggle latch element and consequent outward movement of said plunger against the force of said spring.

8. An operating handle for a brake valve device provided with a notched quadrant having a stop portion indicating a terminal position, said handle including a guard portion, a plunger yieldably mounted therein and having a lug, a latch element pivotally connected to said plunger and adapted to rotate into engagement with said guard portion, a spring interposed between said plunger and said latch element for normally positioning the latter in engagement with said lug, in which position said latch element is adapted to cooperate with said quadrant for defining different positions of the handle, and a butt portion formed on said latch element and adapted to engage said stop portion of the quadrant upon movement of the handle to a position adjacent the terminal position, whereby upon continued movement of the handle to said terminal position said spring becomes effective to resist rotation of said latch element with a force tending to move the handle out of said terminal position.

CECIL S. KELLEY.